(12) United States Patent
Bi

(10) Patent No.: US 12,360,891 B2
(45) Date of Patent: Jul. 15, 2025

(54) MEMORY SYSTEM HOST DATA RESET FUNCTION

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/441,945

(22) Filed: Feb. 14, 2024

(65) Prior Publication Data

US 2024/0281373 A1 Aug. 22, 2024

Related U.S. Application Data

(60) Provisional application No. 63/486,375, filed on Feb. 22, 2023.

(51) Int. Cl.
*G06F 12/02* (2006.01)
*G06F 12/123* (2016.01)

(52) U.S. Cl.
CPC ...... *G06F 12/0253* (2013.01); *G06F 12/0246* (2013.01); *G06F 12/123* (2013.01)

(58) Field of Classification Search
CPC ............. G06F 12/0253; G06F 12/0246; G06F 12/123; G06F 2212/1024; G06F 2212/1032; G06F 2212/7201; G06F 2212/7205; G06F 2212/7206; G06F 12/0646; G11C 11/401
See application file for complete search history.

(56) References Cited

U.S. PATENT DOCUMENTS

| | | | | |
|---|---|---|---|---|
| 8,407,449 B1* | 3/2013 | Colon | ................. | G06F 12/0246 |
| | | | | 711/159 |
| 10,224,090 B2* | 3/2019 | Bains | ................ | G11C 11/40618 |
| 11,119,691 B1* | 9/2021 | Nemawarkar | ........ | G06F 3/0679 |
| 2008/0052452 A1* | 2/2008 | Chow | .................... | G07C 9/257 |
| | | | | 711/E12.001 |
| 2015/0023097 A1* | 1/2015 | Khoueir | ............ | G11C 16/0483 |
| | | | | 365/189.011 |
| 2020/0258566 A1* | 8/2020 | Schaefer | ........... | G11C 11/40615 |
| 2021/0373810 A1* | 12/2021 | Cho | ...................... | G06F 3/0679 |
| 2024/0354032 A1* | 10/2024 | Basu | ...................... | G06F 3/0604 |

* cited by examiner

*Primary Examiner* — Tasnima Matin
(74) *Attorney, Agent, or Firm* — Holland & Hart LLP

(57) ABSTRACT

Methods, systems, and devices for a memory system host data reset function are described. A reset operation may be performed to reset data in a memory system without erasing host data from the memory system. The memory system and a host system may perform the reset operation to sequentially reorder the data across pages and blocks of the memory system, mitigating holes in the data. The reset operation may enable sequentially reordering the data by performing refresh operations on the blocks and performing a subsequent garbage collection operation to consolidate the data within the pages of the refreshed blocks. The host system may reorganize the logical block addresses associated with the blocks and the memory system may perform the refresh operations and the garbage collection operations. The blocks may be refreshed according to an order of access frequency and according to a measure of performance impact on the memory system.

20 Claims, 8 Drawing Sheets

MEMORY SYSTEM HOST DATA RESET FUNCTION

CROSS REFERENCE

The present application for patent claims the benefit of U.S. Provisional Patent Application No. 63/486,375 by BI, entitled "MEMORY SYSTEM HOST DATA RESET FUNCTION," filed Feb. 22, 2023, assigned to the assignee hereof, and expressly incorporated by reference herein.

TECHNICAL FIELD

The following relates to one or more systems for memory, including memory system host data reset function.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

In some cases, data stored in blocks of a memory system may become non-sequential over time due to repeated access operations performed on the blocks. For example, due to various access operations, the data for a specific application may be spread (e.g., ordered) across non-sequential blocks or non-sequential pages of the blocks such that holes (e.g., absences of data) may exist in or between the data for the specific application. In some such cases, the memory system may perform a relatively greater quantity of access operations to access the non-sequential data, thereby increasing latency associated with accessing the non-sequential data and decreasing the performance of the memory system. Over time, the performance of the memory system may continually decrease such that a host system (e.g., a user of the host system) may perform a reset operation (e.g., a factory reset) on the memory system by reordering the data (e.g., sequentially) and removing holes to improve the performance of the memory system. However, the reset operation may include erasing host data (e.g., user data) from the memory system, which may be undesirable for the host system.

In accordance with examples as described herein, a reset operation may be performed on data in a memory system to reset the distribution of the data in the logical addressing space and the physical addressing space without erasing host data from the memory system. The reset operation may be cooperatively performed by the memory system and a host system (e.g., coupled with the memory system) to reset the data in the memory system such that the data is sequentially ordered across pages and blocks of the memory system, thereby removing holes in the data. The reset operation may enable sequentially reordering the data without erasing the host data by performing refresh operations on the blocks and performing a subsequent garbage collection operation to consolidate the data within the pages of the refreshed blocks. In some examples, as part of performing the reset operation, the host system may reorganize logical block addresses corresponding to the blocks and the memory system may perform the refresh operations and the garbage collection operation. In some implementations, the blocks may be refreshed according to an order of access frequency and according to a measure of performance impact on the memory system. In some cases, system data may be identified as sequentially ordered and absent of holes, such that the reset operation may not be performed on the system data. Aside from mitigating erasing the host data, performing the refresh operation as described herein may additionally improve storing the data such that the data may be accessed without increasing relative latency or decreasing relative performance at the memory system, among other advantages.

Figure 1:
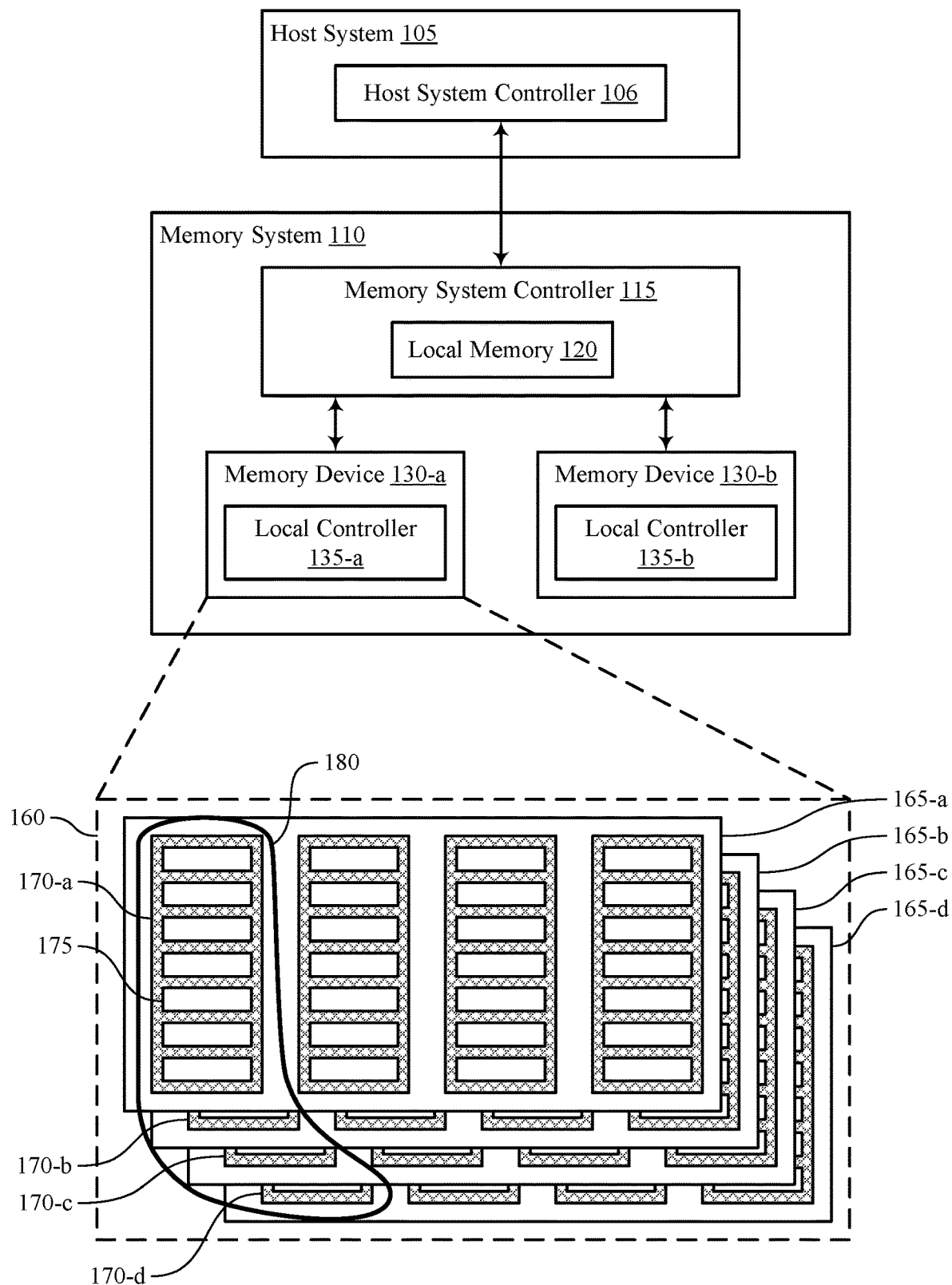
FIG. 1 illustrates an example of a system that supports memory system host data reset function in accordance with examples as disclosed herein.

Features of the disclosure are initially described in the context of systems, devices, and circuits with reference to FIG. 1. Features of the disclosure are described in the context of data management diagrams and a process flow with reference to FIGS. 2A, 2B, and 3. These and other features of the disclosure are further illustrated by and described in the context of an apparatus diagram and flowchart that relate to memory system host data reset function with reference to FIGS. 4 through 7.

FIG. 1 illustrates an example of a system 100 that supports memory system host data reset function in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The host system 105 and the memory system 110 may communicate various types of information. For example, the host system 105 and the memory system 110 may communicate host data and system data. The host data may be associated with a user of the host system 105 (e.g., application data, installed application, user media, user data) and the system data may be associated with operating the memory system 110 (e.g., factory settings, operating systems, system settings). In some examples, the host system 105 and the memory system 110 may communicate information associated with different access frequencies (e.g., different likelihoods of being overwritten or invalidated, such as within a period of time), which may correspond to different types of information. For example, hot information (e.g., hot host data, hot system data) may be associated with a higher access frequency relative to other types of information. Cold information (e.g., cold data, cold metadata) may be associated with a lower access frequency relative to other types of information. Various other "degrees" of temperature, such as warm information, may be associated with access frequency at various ranges between those of hot information and cold information. That is, each type of information may be associated with a respective access frequency of the information.

The system 100 may include any quantity of non-transitory computer readable media that supports the memory system host data reset function. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

In accordance with examples as described herein, a reset operation may be performed on data in the memory system 110 to reset the data without erasing host data from the memory system 110. The reset operation may be cooperatively performed by the host system 105 and the memory system 110 to reset the data in the memory system 110, such that the data may be sequentially ordered across the pages 175 and the blocks 170 of the memory system 110, thereby removing holes in the data. The reset operation may enable sequentially reordering the data without erasing the host data from the memory system 110 by performing refresh operations on the blocks 170 and performing a subsequent garbage collection operation to consolidate the data within the pages 175 of the refreshed blocks 170. In some examples, as part of performing the reset operation, the host system 105 may reorganize the logical block addresses associated with the blocks 170 and the memory system 110 may perform the refresh operations and the garbage collection operation. In some implementations, the blocks 170 may be refreshed according to an order of access frequency and according to a measure of performance impact on the memory system 110. In some cases, system data may be identified as sequentially ordered and absent of holes such that the reset operation may not be performed on the system data. Aside from preventing erasing the host data, performing the refresh operation as described herein may additionally improve storing the data such that the data may be accessed without increasing relative latency or decreasing relative performance at the memory system 110, among other advantages.

Figure 2A:
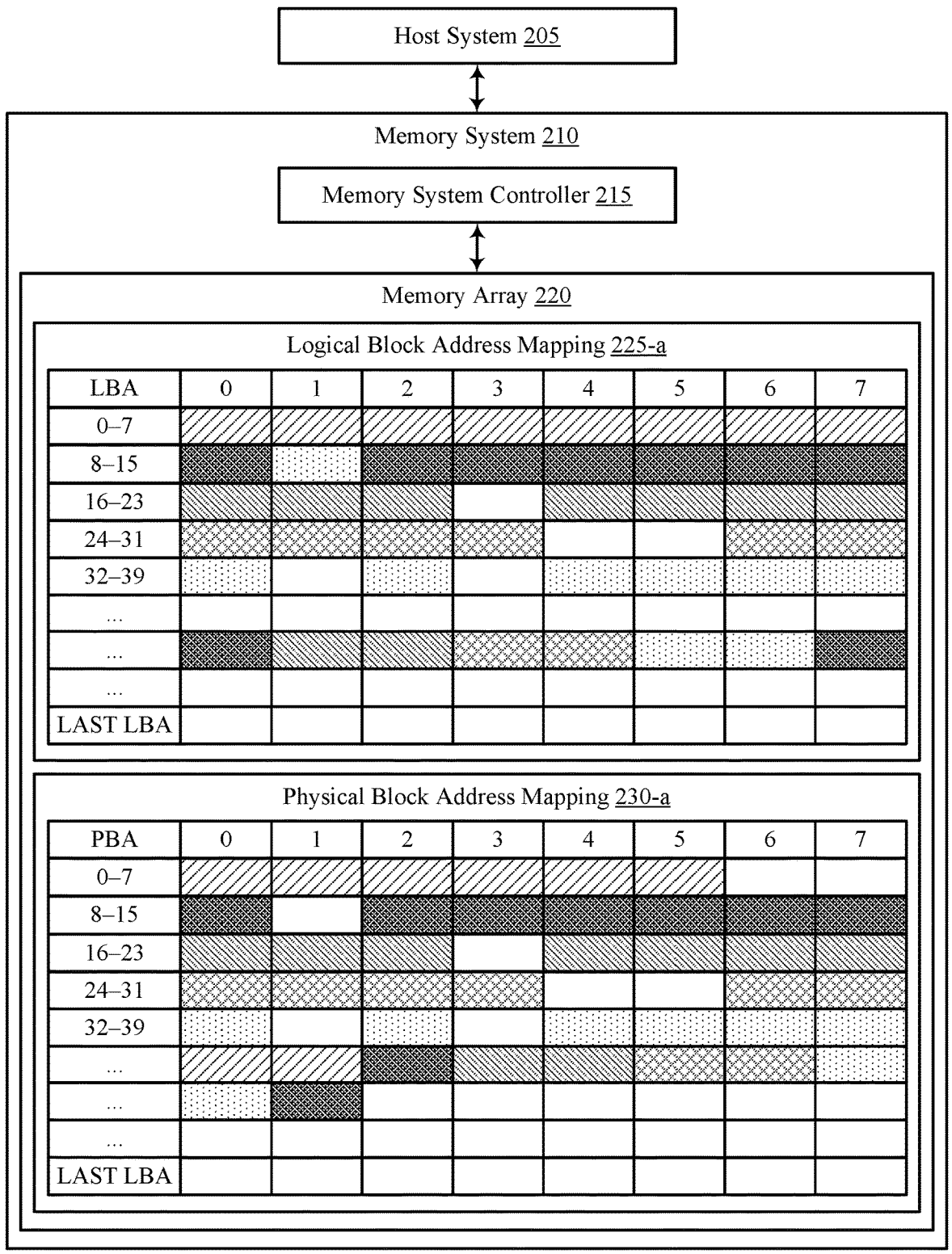
FIGS. 2A and 2B illustrate examples of data management diagrams that support memory system host data reset function in accordance with examples as disclosed herein.
Figure 2B:
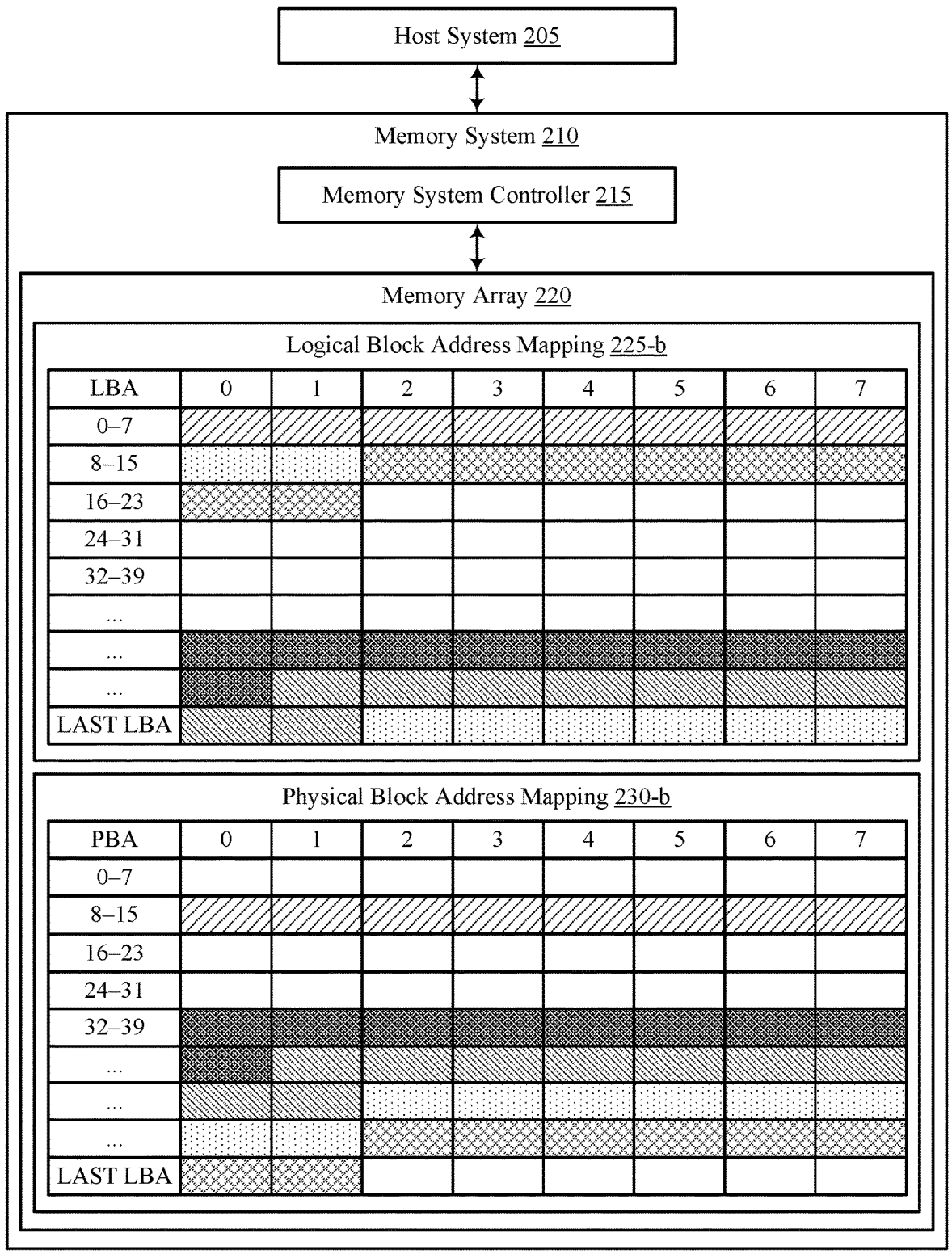

FIGS. 2A and 2B illustrate examples of data management diagrams 200-*a* and 200-*b* that support a memory system host data reset function in accordance with examples as disclosed herein. The data management diagrams 200-*a* and 200-*b* may implement aspects of a system 100, as described with reference to FIG. 1. For example, the data management diagrams 200-*a* and 200-*b* may include a host system 205 and a memory system 210, which may be examples of a host system 105 and a memory system 110 described with reference to FIG. 1, respectively. The data management diagram 200-*a* illustrates an example of data in a memory system 210 prior to performing a reset operation, and the data management diagram 200-*b* illustrates an example of data in a memory system 210 after performing the reset operation.

The memory system 210 may include a memory system controller 215, which may be an example of a memory system controller 115 as described with reference to FIG. 1. The memory system controller 215 may be configured to communicate with the host system 205 to perform operations on the memory system 210. For example, the memory system controller 215 may be configured to receive data, commands, or mapping information from the host system 205. The memory system 210 may also include a memory array 220, where the memory array 220 includes non-volatile storage elements (e.g., NAND memory cells). The memory array 220 may include a quantity of blocks, each addressable by a logical block address and a physical block address. Each block may include a quantity of pages, where each page may be configured to store data.

The data management diagrams 200-*a* and 200-*b* may include a logical block address mapping 225 (e.g., logical block address mapping 225-*a* and 225-*b*, respectively) and a physical block address mapping 230 (physical block address mapping 230-*a* and 230-*b*, respectively). The logical block address mapping 225 illustrates the logical block addresses corresponding to each block of the memory array 220. Additionally, the logical block address mapping 225 illustrates a type of data stored in each block corresponding to each logical block address. The physical block address mapping 230 illustrates the physical block addresses corresponding to each block of the memory array 220. Additionally, the physical block address mapping 230 illustrates the type of data stored in each block corresponding to each physical block address. Each logical block address in the logical block address mapping 225 may map to a respective physical block address in the physical block address mapping 230. Additionally, the data management diagrams 200-*a* and 200-*b* illustrate the type of data stored in each block corresponding to the logical block addresses and the physical block addresses. The data may be host data or system data (e.g., factory settings, an operating system, operating settings), where the host data may include user media (e.g., photographs, files, videos), application data, installed applications, or user data.

The data management diagram 200-*a* illustrates the memory system 210 prior to performing the reset operation. For example, the data is non-sequential across the blocks, such that holes (e.g., absences of data) exist across the blocks. Further, the data is not sequentially ordered by the type of data, such that different types of data may be intermixed across a subset of the blocks. Accessing the data in the blocks according to the data management diagram 200-*a* may be associated with a relatively greater quantity of access operations, thereby causing relatively increased latency associated with performing the access operations. However, the data management diagram 200-*b* illustrates the memory system 210 after performing the reset operation. For example, the data is sequentially ordered across the blocks, such that holes are not present across the blocks. Further, the data is sequentially ordered by the type of data, such that a same type of data is contiguous across a subset of the blocks. According to the data management diagram 200-*b*, accessing the data in the blocks may be associated with a relatively fewer quantity of access operations, thereby causing relatively decreased latency associated with performing the access operations.

Performing the reset operation on the data may first include determining to perform the reset operation. In some cases, the host system 205 may determine to perform the reset operation based on an indication from a user of the host system 205. In other cases, the memory system 210 may determine to perform the reset operation based on determining a decrease in performance that satisfies a threshold. In some examples, the host system 205 or the memory system 210 may determine to perform the reset operation (e.g., and notify the other system) based on a trigger. For example, the trigger may include a quantity of access operations performed on the memory system 210, a duration since a prior reset operation was performed (e.g., or an initial duration after factory release), or when a level of performance of the memory system 210 satisfies a threshold.

In some cases, performing the reset operation may include unmapping temporary data stored at the memory system 210, which may include erasing or overwriting the temporary data. In some examples, the temporary data may be stored in a volatile memory portion (e.g., a cache) of the memory system 210, and unmapping the temporary data may include clearing the volatile memory portion. The unmapping of the temporary data may free additional memory for use by the reset operation.

In some cases, performing the reset operation may include allocating a portion of the memory system 210 for temporarily storing data (e.g., host data) during performing the reset operation (e.g., a data bridge). Allocating the portion may include identifying a quantity of logical block addresses and physical block addresses of the memory array 220 for storing the data based on determining a size of the data. For example, the host system 205 may allocate a quantity of logical block addresses and the memory system 210 may allocate a quantity of physical block addresses corresponding to a determined quantity of blocks for temporarily storing the data. In some examples, the allocated portion may be a portion of the memory system 210 originally intended for recovery, but reused as the allocated portion. For example, the host system 205 may repurpose a recovery partition (e.g., a swap partition) of logical block addresses to serve as the allocated portion. In some such cases, the allocated portion may be used to give additional space for transferring data between pages or blocks of the memory system 210 during performing the reset operation (e.g., when space is limited within the memory system 210).

In some cases, the host system 205 may pause (e.g., disable) write operations during performing the reset operation. For example, the host system 205 may determine to cease transmitting write commands to the memory system 210 for a duration associated with performing the reset operation. Additionally or alternatively, the memory system 210 may pause background memory management operations (e.g., refreshes, garbage collections, updates, internal data transfers) for the duration.

The host system 205 may perform a reorganizing operation on the logical block addresses of the logical block address mapping 225 as part of the reset operation. For example, the host system 205 may reorder the data or remap the logical block addresses such that the data may be sequentially ordered across the logical block addresses and reduces holes between related data. In some cases, the host system 205 may perform the reorganization operation in an order based on a relative access frequency of the data. For example, cold data (e.g., data accessed relatively infrequently) may be reorganized first, followed by hot data (e.g., data accessed relatively frequently). In some examples, identifying the relative access frequency of the data may include identifying the type of data. For example, installed applications may be associated with cold data, whereas application data may be associated with hot data. In some examples, identifying the relative access frequency of the data may include identifying a version number or a stream identifier associated with the data, where an older version number or stream identifier may indicate the data is cold data. In some cases, the host system 205 may perform the reorganization operation in an order based on a measure of performance of the blocks. For example, the blocks identified with having a decrease in performance over a given duration may be reorganized relatively earlier in the order. Additionally or alternatively, the blocks identified with having a high impact on the performance of the memory system 210 may be reorganized relatively earlier in the order. In some cases, the host system 205 may perform the reorganization operation on the logical block addresses associated with storing the host data and may not perform the reorganization operation on the logical block addresses associated with storing the system data.

After performing the reorganization operation, the host system 205 may update a mapping associated with the logical block addresses. For example, the host system 205 may update the logical block address mapping 225 to indicate the reorganized logical block addresses. In other examples, the host system 205 may update a mapping between the logical block addresses and the physical block addresses (e.g., an L2P table).

The memory system 210 may perform a quantity of refresh operations on the blocks as part of the reset operation. For example, the memory system 210 may refresh the data such that the data may be sequentially ordered across the blocks without holes. In some cases, the memory system 210 may perform the refresh operations in an order based on a relative access frequency of the data. For example, cold data (e.g., data accessed relatively infrequently) may be refreshed first, followed by hot data (e.g., data accessed relatively frequently). In some examples, identifying the relative access frequency of the data may include identifying the type of data. For example, installed applications may be associated with cold data, whereas application data may be associated with hot data. In some examples, identifying the relative access frequency of the data may include identifying a version number or a stream identifier associated with the data, where an older version number or stream identifier may indicate the data is cold data. In some cases, the memory system 210 may perform the refresh operations on the blocks associated with storing the host data and may not perform the refresh operations on the blocks associated with storing the system data. For example, the system data may not be refreshed due to the system data being sequentially ordered and with fewer holes in the related data.

In some cases, the memory system 210 may perform the refresh operations in an order based on a measure of performance of the blocks. For example, the blocks identified with having a decrease in performance over a given duration may be refreshed relatively earlier in the order. Additionally or alternatively, the blocks identified with having a high impact on the performance of the memory system 210 may be refreshed relatively earlier in the order. The refresh operations may be performed according to a first granularity, where the first granularity is a per-block basis. For example, the refresh operations may refresh entire blocks.

In some cases, the memory system 210 may use the allocated portion for performing the refresh operations based on identifying a lack of space for performing the refresh operations. For example, the memory system 210 may transfer a portion of the data from the memory array 220 to be refreshed to the allocated portion, thereby refreshing the data and subsequently transferring the refreshed data back to the memory array 220. Refreshing the data using the allocated portion may enable the memory system 210 to perform the refresh operations when the memory system 210 does not have space within the memory array 220 to refresh the data.

After performing the refresh operations, the memory system 210 may perform a garbage collection operation on the data in the refreshed blocks. The garbage collection operation may include identifying valid data from the pages of each block (e.g., a source block), transferring the valid data from each block to another respective block (e.g., a target block), and erasing data from the each block after transferring the valid data. Performing the garbage collection operation may consolidate the data in the refreshed blocks such that holes are not present among the pages of each block, thereby improving storage of the data. In some cases, the system data may not be subject to the garbage collection operation due to the system data being sequentially ordered within the blocks and absent of holes in the pages. The garbage collection operation may be performed according to a second granularity less than the first granularity. For example, the garbage collection operation may be performed on a per-page basis, such that data from each page is consolidated.

In accordance with examples as described herein, performing the reset operation may support sequential ordering of the data in both the logical addressing space and the physical addressing space, and improving storage at the memory system 210. Accordingly, accessing the data after performing the reset operation may involve relatively fewer access operations, thereby decreasing a duration associated with performing the access operations. Additionally, performing relatively fewer access operations may support fewer transfers of mappings (e.g., L2P tables) between memory devices of the memory system 210 (e.g., between non-volatile memory devices and volatile memory devices). Thus, performing the reset operation may decrease latency and improve overall performance of the memory system 210. Further, the reset operation may enable the host data to be maintained at the memory system 210 while the memory system 210 is reset (e.g., to factory settings). Therefore, host data is not erased while performing the reset operation.

Figure 3:
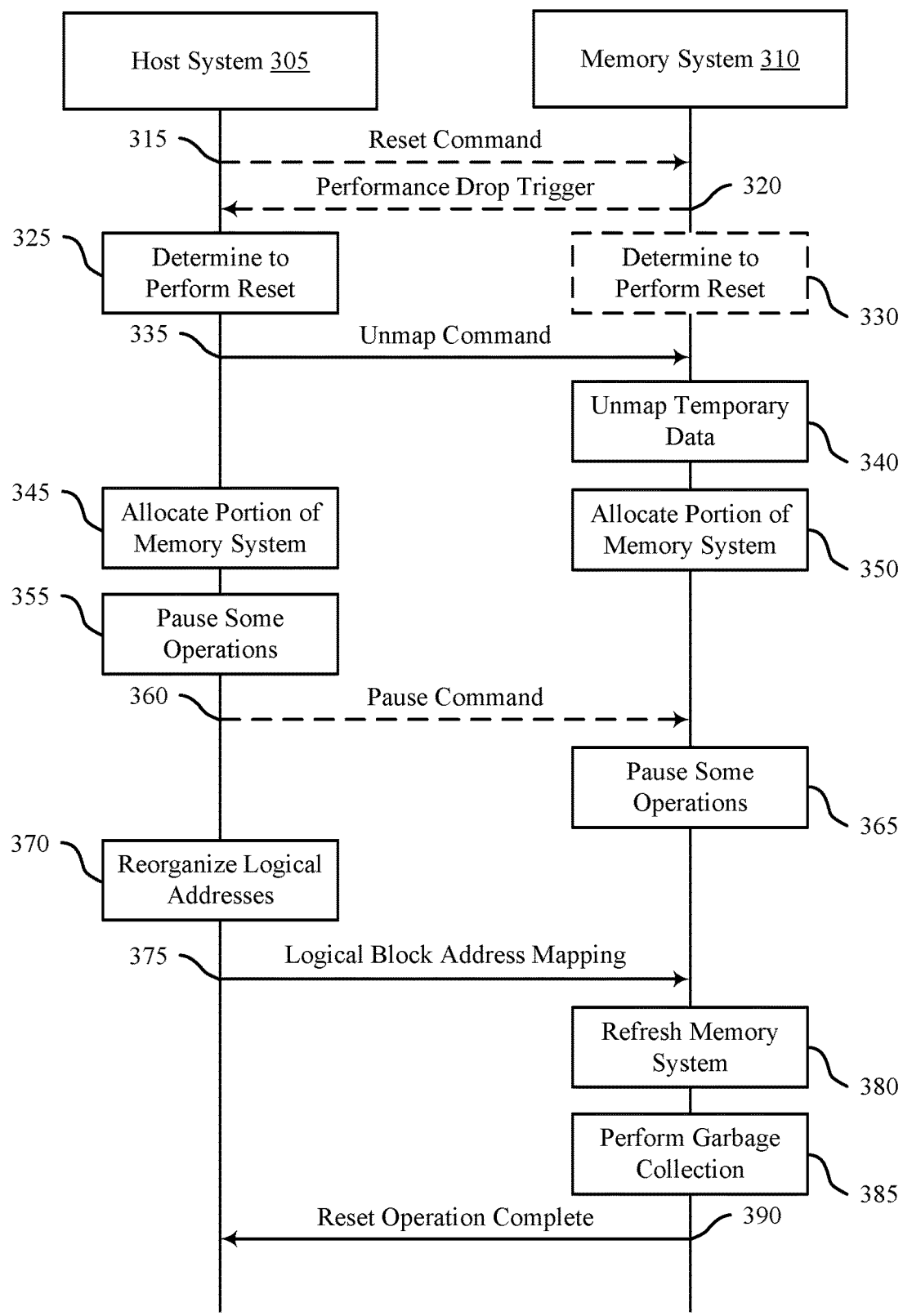
FIG. 3 illustrates an example of a process flow that supports memory system host data reset function in accordance with examples as disclosed herein.

FIG. 3 illustrates an example of a process flow 300 that supports memory system host data reset function in accordance with examples as disclosed herein. The process flow 300 may illustrate aspects or operations of the data management diagrams 200-a and 200-b as described with reference to FIGS. 2A and 2B. For example, the process flow 300 may depict operations at a host system 305 and a memory system 310, which may be examples of a host system 205 and a memory system 210, respectively, as described with reference to FIGS. 2A and 2B. In the following description of the process flow 300, the methods, techniques, processes, and operations may be performed in different orders or at different times. Further, certain operations may be left out of the process flow 300, or other operations may be added to the process flow 300. In accordance with operations as described herein, a reset operation may be performed to reset data in the memory system 310 without erasing host data from the memory system 310. Additionally, the reset operation may support relatively decreased latency and improved performance of the memory system 310.

At 315, the host system 305 may transmit a reset command to the memory system 310 instructing the memory system 310 to begin performing the reset operation. In some cases, the host system 305 may determine to transmit the reset command based on determining to perform the reset operation.

At 320, the memory system 310 may transmit an indication to the host system 305 that a performance drop of the memory system 310 was detected. In some cases, the memory system 310 may determine the performance drop by comparing a performance of the memory system 310 to a threshold.

At 325, the host system 305 may determine to perform the reset operation. In some cases, the host system 305 may determine to perform the reset operation based on receiving the indication of the performance drop from the memory system 310.

At 330, the memory system 310 may determine to perform the reset operation. In some cases, the memory system 310 may determine to perform the reset operation based on receiving the reset command from the host system 305. In some examples, the memory system 310 and the host system 305 may concurrently determine to perform the reset operation such that steps 325 and 330 may occur concurrently.

At 335, the host system 305 may transmit an unmap command to the memory system 310 based on determining to perform the reset operation. In some implementations, the host system 305 may transmit the unmap command based on identifying a quantity of desired space in the memory system 310 for performing the reset operation (e.g., for storing data during performing the reset operation).

At 340, the memory system 310 may unmap temporary data stored in the memory system 310 based on receiving the unmap command from the host system 305. In some cases, unmapping temporary data may include erasing or overwriting the temporary data.

At 345, the host system 305 may allocate a portion of the memory system 310 for performing the reset operation. In some cases, the host system 305 may allocate a quantity of logical block addresses to serve as the allocated portion based on determining a size of data to be refreshed.

At 350, the memory system 310 may allocate the portion of the memory system 310 for performing the reset operation. In some cases, the memory system 310 may allocate a quantity of physical block addresses to serve as the allocated portion based on determining a size of data to be refreshed. In some examples, the memory system 310 may allocate the portion based on receiving an indication of the allocated portion (e.g., the allocated logical block addresses) from the host system 305. In some implementations, the memory system 310 and the host system 305 may concurrently allocate the portion of the memory system 310 such that steps 345 and 350 may occur concurrently.

At 355, the host system 305 may pause (e.g., disable) write operations and/or background operations on the memory system 310. For example, the host system 305 may determine to refrain from transmitting write commands to the memory system 310 for a duration associated with performing the reset operation.

At 360, the host system 305 may transmit a command to the memory system 310 indicating the memory system 310 to pause write operations and/or background memory management operations.

At 365, the memory system 310 may pause write operations and/or background memory management operations, such that the memory system 310 may determine to refrain from performing write operations and/or background memory management operations (e.g., operations that include accessing data) for the duration associated with the reset operation.

At 370, the host system 305 may perform a reorganization operation on the logical block addresses associated with the memory system 310. The host system 305 may reorganize the logical block addresses to remove holes in the data and sequentially order the data across the logical block addresses.

At 375, the host system 305 may transmit a mapping of the updated logical block addresses to the memory system 310.

At 380, the memory system 310 may perform refresh operations on data in blocks of the memory system 310. For example, the memory system 310 may refresh the data in the physical block addresses to remove holes in the data (e.g., at a block level granularity) and sequentially order the data across the blocks of the memory system 310. In some cases, the memory system 310 may perform the refresh operations based on receiving the mapping from the host system 305.

At 385, the memory system 310 may perform a garbage collection operation on the refreshed data in the memory system 310. The memory system 310 may perform the garbage collection to remove holes in the data (e.g., at a page level granularity) and sequentially order the data across pages of the block of the memory system 310.

At 390, the memory system 310 may transmit an indication to the host system 305 that the reset operation has been completed.

Performing the reset operation as described herein may support sequential ordering of the data, improving storage at the memory system 310. Accordingly, accessing the data after performing the reset operation may involve relatively fewer access operations, thereby decreasing a duration associated with performing the access operations. Thus, performing the reset operation may decrease latency and improve overall performance of the memory system 310. Further, the reset operation may enable the host data to be maintained at the memory system 310 while the memory system 310 is reset (e.g., to factory settings). Therefore, host data is not erased while performing the reset operation.

Figure 4:
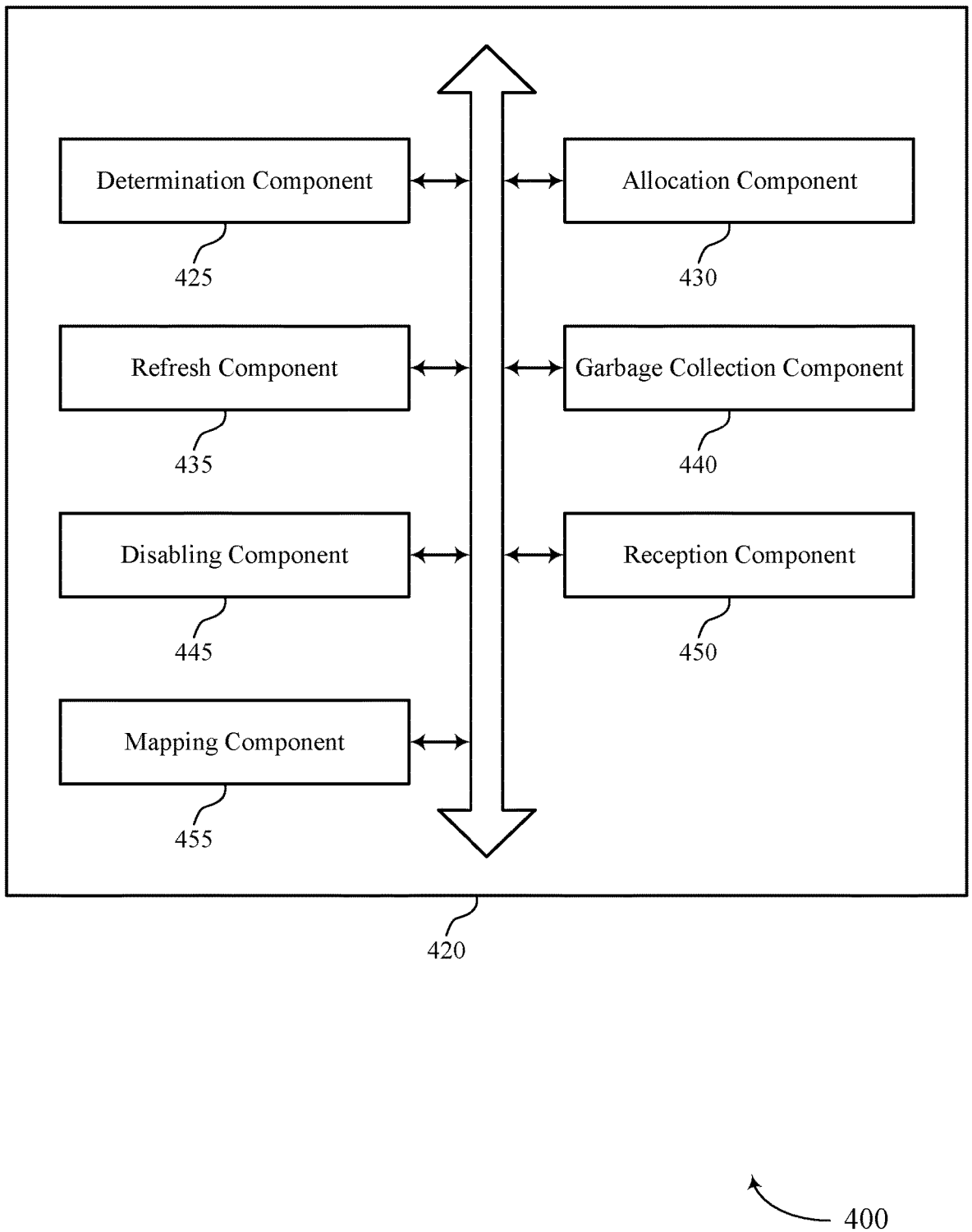
FIG. 4 illustrates a block diagram of a memory system that supports memory system host data reset function in accordance with examples as disclosed herein.

FIG. 4 illustrates a block diagram 400 of a memory system 420 that supports the memory system host data reset function in accordance with examples as disclosed herein. The memory system 420 may be an example of aspects of a memory system as described with reference to FIGS. 1 through 3. The memory system 420, or various components thereof, may be an example of means for performing various aspects of memory system host data reset function as described herein. For example, the memory system 420 may include a determination component 425, an allocation component 430, a refresh component 435, a garbage collection component 440, a disabling component 445, a reception component 450, a mapping component 455, or any combination thereof. Each of these components may communicate, directly or indirectly, with one another (e.g., via one or more buses).

The determination component 425 may be configured as or otherwise support a means for determining to perform a reset operation on a memory system to reorganize logical addresses and physical addresses of the memory system associated with storing host data. The allocation component 430 may be configured as or otherwise support a means for allocating a portion of the memory system for temporarily storing the host data based on determining to perform the reset operation. The refresh component 435 may be configured as or otherwise support a means for performing a plurality of refresh operations on the host data in a plurality of blocks associated with the logical addresses of the memory system using the allocated portion of the memory system, where the plurality of refresh operations are performed on blocks of the plurality of blocks in an order based on a relative frequency of accessing the host data stored in the plurality of blocks. The garbage collection component 440 may be configured as or otherwise support a means for performing, based on performing the plurality of refresh operations, a garbage collection operation to consolidate the host data from pages of the plurality of blocks.

In some examples, the disabling component 445 may be configured as or otherwise support a means for disabling a functionality for performing write operations on the memory system for a duration associated with performing the reset operation.

In some examples, to support disabling the functionality, the disabling component 445 may be configured as or otherwise support a means for disabling the functionality for performing the write operations indicated by write commands from a host system coupled with the memory system.

In some examples, to support disabling the functionality, the disabling component 445 may be configured as or otherwise support a means for disabling the functionality for performing background memory management operations by the memory system.

In some examples, the determination component 425 may be configured as or otherwise support a means for determining that a decrease in an access performance of the memory system satisfies a threshold, where determining to perform the reset operation is based on identifying that the decrease in the access performance satisfies the threshold.

In some examples, the reception component 450 may be configured as or otherwise support a means for receiving a command to perform the reset operation from a host system coupled with the memory system, where determining to perform the reset operation is based on receiving the command.

In some examples, to support allocating the portion, the allocation component 430 may be configured as or otherwise support a means for allocating a quantity of the physical addresses of the memory system for temporarily storing the host data, the quantity based on determining a size of the host data to be temporarily stored.

In some examples, the reception component 450 may be configured as or otherwise support a means for receiving a command from a host system coupled with the memory system to unmap temporary data stored by the memory system based on determining to perform the reset operation. In some examples, the mapping component 455 may be configured as or otherwise support a means for unmapping the temporary data from the memory system based on receiving the command.

In some examples, the allocation component 430 may be configured as or otherwise support a means for identifying a portion of a non-volatile memory device of the memory system dedicated for recovery to serve as the allocated portion of the memory system, where allocating the portion of the memory system for temporarily storing the host data is based on identifying the portion of the non-volatile memory device.

In some examples, to support performing the plurality of refresh operations, the refresh component 435 may be configured as or otherwise support a means for identifying that a first portion of the host data is accessed relatively infrequently and that a second portion of the host data is accessed relatively frequently. In some examples, to support performing the plurality of refresh operations, the refresh component 435 may be configured as or otherwise support a means for refreshing the first portion of the host data before refreshing the second portion of the host data.

In some examples, identifying whether the first portion or the second portion of the host data is accessed relatively infrequently or frequently is based on identifying version numbers associated with the first portion or the second portion of the host data, respectively.

In some examples, identifying whether the first portion or the second portion of the host data is accessed relatively infrequently or frequently is based on a stream identifier associated with the first portion or the second portion of the host data, respectively.

In some examples, identifying whether the first portion or the second portion of the host data is accessed relatively infrequently or frequently is based on determining whether a decrease in an access performance of the first portion or the second portion of the host data satisfies a threshold, respectively.

In some examples, to support performing the garbage collection operation, the garbage collection component 440 may be configured as or otherwise support a means for identifying valid data from the pages of a source block the plurality of blocks. In some examples, to support performing the garbage collection operation, the garbage collection component 440 may be configured as or otherwise support a means for transferring the valid data from the source block to a target block of the plurality of blocks. In some examples, to support performing the garbage collection operation, the garbage collection component 440 may be configured as or otherwise support a means for erasing data from the source block.

In some examples, the plurality of refresh operations are performed according to a first granularity, and the garbage collection operation is performed according to a second granularity less than the first granularity. In some examples, the first granularity is a per-block basis and the second granularity is a per-page basis.

In some examples, the mapping component 455 may be configured as or otherwise support a means for updating a mapping between the logical addresses and the physical addresses of the memory system based on a host system coupled with the memory system reorganizing the logical addresses.

In some examples, the logical addresses and physical addresses of the memory system exclude system data.

Figure 5:
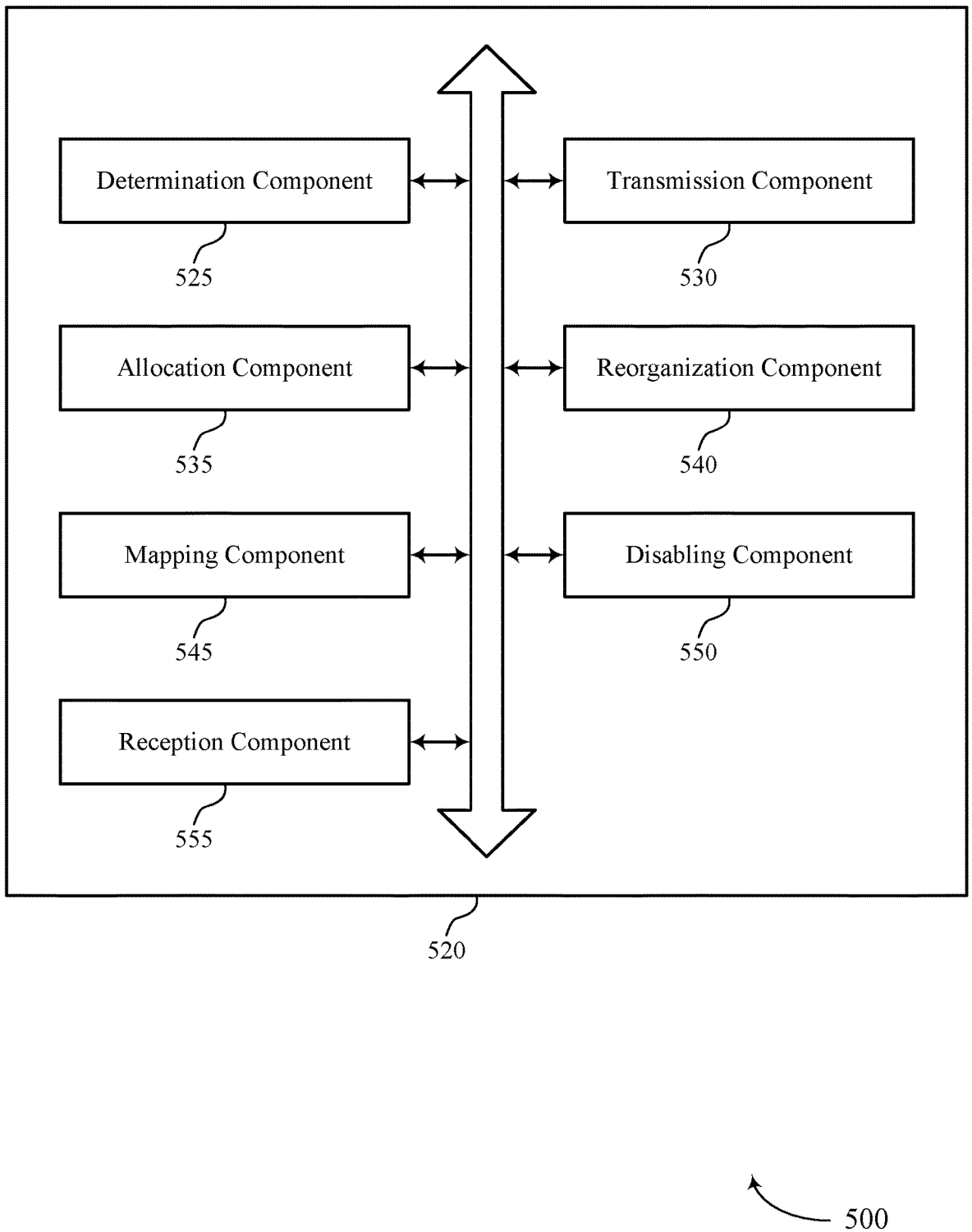
FIG. 5 illustrates a block diagram of a host system that supports memory system host data reset function in accordance with examples as disclosed herein.

FIG. 5 illustrates a block diagram 500 of a host system 520 that supports memory system host data reset function in accordance with examples as disclosed herein. The host system 520 may be an example of aspects of a host system as described with reference to FIGS. 1 through 3. The host system 520, or various components thereof, may be an example of means for performing various aspects of memory system host data reset function as described herein. For example, the host system 520 may include a determination component 525, a transmission component 530, an allocation component 535, a reorganization component 540, a mapping component 545, a disabling component 550, a reception component 555, or any combination thereof. Each of these components may communicate, directly or indirectly, with one another (e.g., via one or more buses).

The determination component 525 may be configured as or otherwise support a means for determining, by a host system, to perform a reset operation on a memory system coupled with the host system to reorganize logical addresses and physical addresses of the memory system associated with storing host data. The transmission component 530 may be configured as or otherwise support a means for transmitting a command to the memory system to unmap temporary data stored in the memory system based on determining to perform the reset operation. The allocation component 535 may be configured as or otherwise support a means for allocating, by the host system, a portion of the memory system for temporarily storing the host data based on determining to perform the reset operation. The reorganization component 540 may be configured as or otherwise support a means for performing a reorganization operation on the logical addresses of the memory system associated with storing the host data, where the reorganization operation is performed on blocks associated with the logical addresses based on a relative frequency of accessing the host data stored in the blocks. The mapping component 545 may be configured as or otherwise support a means for updating a mapping between the logical addresses and physical addresses of the memory system based on performing the reorganization operation.

In some examples, the transmission component 530 may be configured as or otherwise support a means for transmitting an indication of the mapping to the memory system based on updating the mapping.

In some examples, the reorganization operation includes a garbage collection operation on the logical addresses of the memory system.

In some examples, the disabling component 550 may be configured as or otherwise support a means for disabling a functionality for performing write operations on the memory system for a duration associated with performing the reset operation.

In some examples, the reception component 555 may be configured as or otherwise support a means for receiving an indication from the memory system that a decrease in an access performance of the memory system satisfies a threshold, where determining to perform the reset operation is based on receiving the indication.

In some examples, the transmission component 530 may be configured as or otherwise support a means for transmitting a second command to the memory system to perform the reset operation, where determining to perform the reset operation is based on receiving the second command.

In some examples, to support allocating the portion, the allocation component 535 may be configured as or otherwise support a means for allocating a quantity of the logical addresses of the memory system for temporarily storing the host data, the quantity based on determining a size of the host data to be temporarily stored.

In some examples, the allocation component 535 may be configured as or otherwise support a means for identifying a portion of a non-volatile memory device of the memory system dedicated for recovery to serve as the allocated portion of the memory system, where allocating the portion of the memory system for temporarily storing the host data is based on identifying the portion of the non-volatile memory device.

In some examples, to support performing the reorganization operation, the reorganization component 540 may be configured as or otherwise support a means for identifying that a first portion of the host data is accessed relatively infrequently and that a second portion of the host data is accessed relatively frequently. In some examples, to support performing the reorganization operation, the reorganization component 540 may be configured as or otherwise support a means for reorganizing the first portion of the host data before reorganizing the second portion of the host data.

In some examples, identifying whether the first portion or the second portion of the host data is accessed relatively infrequently or frequently is based on identifying version numbers associated with the first portion or the second portion of the host data, respectively.

In some examples, identifying whether the first portion or the second portion of the host data is accessed relatively infrequently or frequently is based on a stream identification value associated with the first portion or the second portion of the host data, respectively.

In some examples, the logical addresses and physical addresses of the memory system exclude system data.

Figure 6:
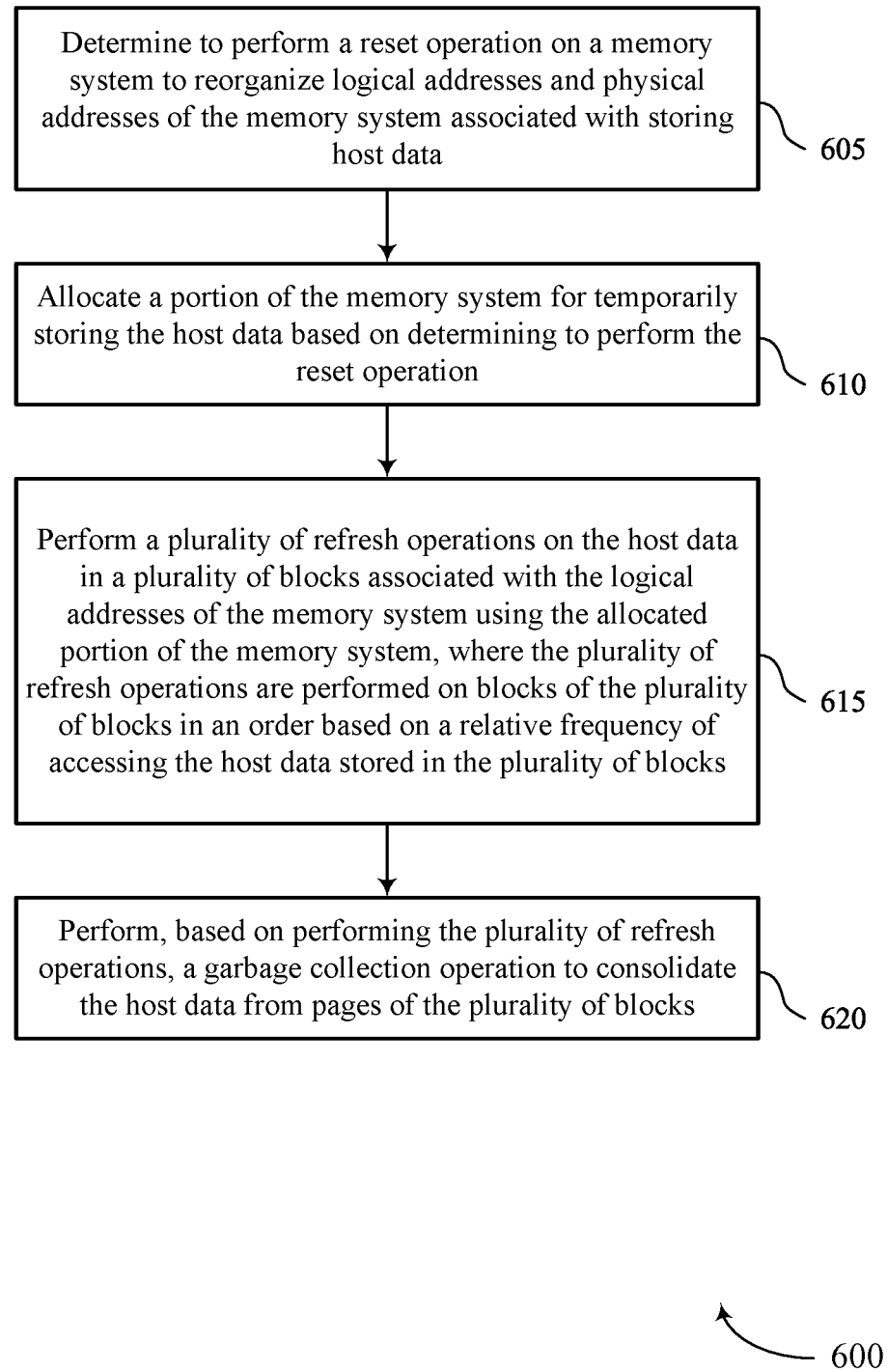
FIGS. 6 and 7 illustrate flowcharts showing a method or methods that support memory system host data reset function in accordance with examples as disclosed herein.

FIG. 6 illustrates a flowchart showing a method 600 that supports memory system host data reset function in accordance with examples as disclosed herein. The operations of method 600 may be implemented by a memory system or its components as described herein. For example, the operations of method 600 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 605, the method may include determining to perform a reset operation on a memory system to reorganize logical addresses and physical addresses of the memory system associated with storing host data. The operations of 605 may be performed in accordance with examples as disclosed herein. In some examples, aspects of the operations of 605 may be performed by a determination component 425 as described with reference to FIG. 4.

At 610, the method may include allocating a portion of the memory system for temporarily storing the host data based on determining to perform the reset operation. The operations of 610 may be performed in accordance with examples as disclosed herein. In some examples, aspects of the operations of 610 may be performed by an allocation component 430 as described with reference to FIG. 4.

At 615, the method may include performing a plurality of refresh operations on the host data in a plurality of blocks associated with the logical addresses of the memory system using the allocated portion of the memory system, where the plurality of refresh operations are performed on blocks of the plurality of blocks in an order based on a relative frequency of accessing the host data stored in the plurality of blocks. The operations of 615 may be performed in accordance with examples as disclosed herein. In some examples, aspects of the operations of 615 may be performed by a refresh component 435 as described with reference to FIG. 4.

At 620, the method may include performing, based on performing the plurality of refresh operations, a garbage collection operation to consolidate the host data from pages of the plurality of blocks. The operations of 620 may be performed in accordance with examples as disclosed herein. In some examples, aspects of the operations of 620 may be performed by a garbage collection component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for determining to perform a reset operation on a memory system to reorganize logical addresses and physical addresses of the memory system associated with storing host data; allocating a portion of the memory system for temporarily storing the host data based on determining to perform the reset operation; performing a plurality of refresh operations on the host data in a plurality of blocks associated with the logical addresses of the memory system using the allocated portion of the memory system, where the plurality of refresh operations are performed on blocks of the plurality of blocks in an order based on a relative frequency of accessing the host data stored in the plurality of blocks; and performing, based on performing the plurality of refresh operations, a garbage collection operation to consolidate the host data from pages of the plurality of blocks.

Aspect 2: The method, apparatus, or non-transitory computer-readable medium of aspect 1, further including operations, features, circuitry, logic, means, or instructions, or any combination thereof for disabling a functionality for performing write operations on the memory system for a duration associated with performing the reset operation.

Aspect 3: The method, apparatus, or non-transitory computer-readable medium of aspect 2, where disabling the functionality includes operations, features, circuitry, logic, means, or instructions, or any combination thereof for disabling the functionality for performing the write operations indicated by write commands from a host system coupled with the memory system.

Aspect 4: The method, apparatus, or non-transitory computer-readable medium of any of aspects 2 through 3, where disabling the functionality includes operations, features, circuitry, logic, means, or instructions, or any combination thereof for disabling the functionality for performing background memory management operations by the memory system.

Aspect 5: The method, apparatus, or non-transitory computer-readable medium of any of aspects 1 through 4, further including operations, features, circuitry, logic, means, or instructions, or any combination thereof for determining that a decrease in an access performance of the memory system satisfies a threshold, where determining to perform the reset operation is based on identifying that the decrease in the access performance satisfies the threshold.

Aspect 6: The method, apparatus, or non-transitory computer-readable medium of any of aspects 1 through 5, further including operations, features, circuitry, logic, means, or instructions, or any combination thereof for receiving a command to perform the reset operation from a host system coupled with the memory system, where determining to perform the reset operation is based on receiving the command.

Aspect 7: The method, apparatus, or non-transitory computer-readable medium of any of aspects 1 through 6, where allocating the portion includes operations, features, circuitry, logic, means, or instructions, or any combination thereof for allocating a quantity of the physical addresses of the memory system for temporarily storing the host data, the quantity based on determining a size of the host data to be temporarily stored.

Aspect 8: The method, apparatus, or non-transitory computer-readable medium of any of aspects 1 through 7, further including operations, features, circuitry, logic, means, or instructions, or any combination thereof for receiving a command from a host system coupled with the memory system to unmap temporary data stored by the memory system based on determining to perform the reset operation and unmapping the temporary data from the memory system based on receiving the command.

Aspect 9: The method, apparatus, or non-transitory computer-readable medium of any of aspects 1 through 8, further including operations, features, circuitry, logic, means, or instructions, or any combination thereof for identifying a portion of a non-volatile memory device of the memory system dedicated for recovery to serve as the allocated portion of the memory system, where allocating the portion of the memory system for temporarily storing the host data is based on identifying the portion of the non-volatile memory device.

Aspect 10: The method, apparatus, or non-transitory computer-readable medium of any of aspects 1 through 9, where performing the plurality of refresh operations includes operations, features, circuitry, logic, means, or instructions, or any combination thereof for identifying that a first portion of the host data is accessed relatively infrequently and that a second portion of the host data is accessed relatively frequently and refreshing the first portion of the host data before refreshing the second portion of the host data.

Aspect 11: The method, apparatus, or non-transitory computer-readable medium of aspect 10, where identifying whether the first portion or the second portion of the host data is accessed relatively infrequently or frequently is based on identifying version numbers associated with the first portion or the second portion of the host data, respectively.

Aspect 12: The method, apparatus, or non-transitory computer-readable medium of any of aspects 10 through 11, where identifying whether the first portion or the second portion of the host data is accessed relatively infrequently or frequently is based on a stream identifier associated with the first portion or the second portion of the host data, respectively.

Aspect 13: The method, apparatus, or non-transitory computer-readable medium of any of aspects 10 through 12, where identifying whether the first portion or the second portion of the host data is accessed relatively infrequently or frequently is based on determining whether a decrease in an access performance of the first portion or the second portion of the host data satisfies a threshold, respectively.

Aspect 14: The method, apparatus, or non-transitory computer-readable medium of any of aspects 1 through 13, where performing the garbage collection operation includes operations, features, circuitry, logic, means, or instructions, or any combination thereof for identifying valid data from the pages of a source block the plurality of blocks; transferring the valid data from the source block to a target block of the plurality of blocks; and erasing data from the source block.

Aspect 15: The method, apparatus, or non-transitory computer-readable medium of any of aspects 1 through 14, where the plurality of refresh operations are performed according to a first granularity, and the garbage collection operation is performed according to a second granularity less than the first granularity and the first granularity is a per-block basis and the second granularity is a per-page basis.

Aspect 16: The method, apparatus, or non-transitory computer-readable medium of any of aspects 1 through 15, further including operations, features, circuitry, logic, means, or instructions, or any combination thereof for updating a mapping between the logical addresses and the physical addresses of the memory system based on a host system coupled with the memory system reorganizing the logical addresses.

Aspect 17: The method, apparatus, or non-transitory computer-readable medium of any of aspects 1 through 16, where the logical addresses and physical address of the memory system exclude system data.

Figure 7:
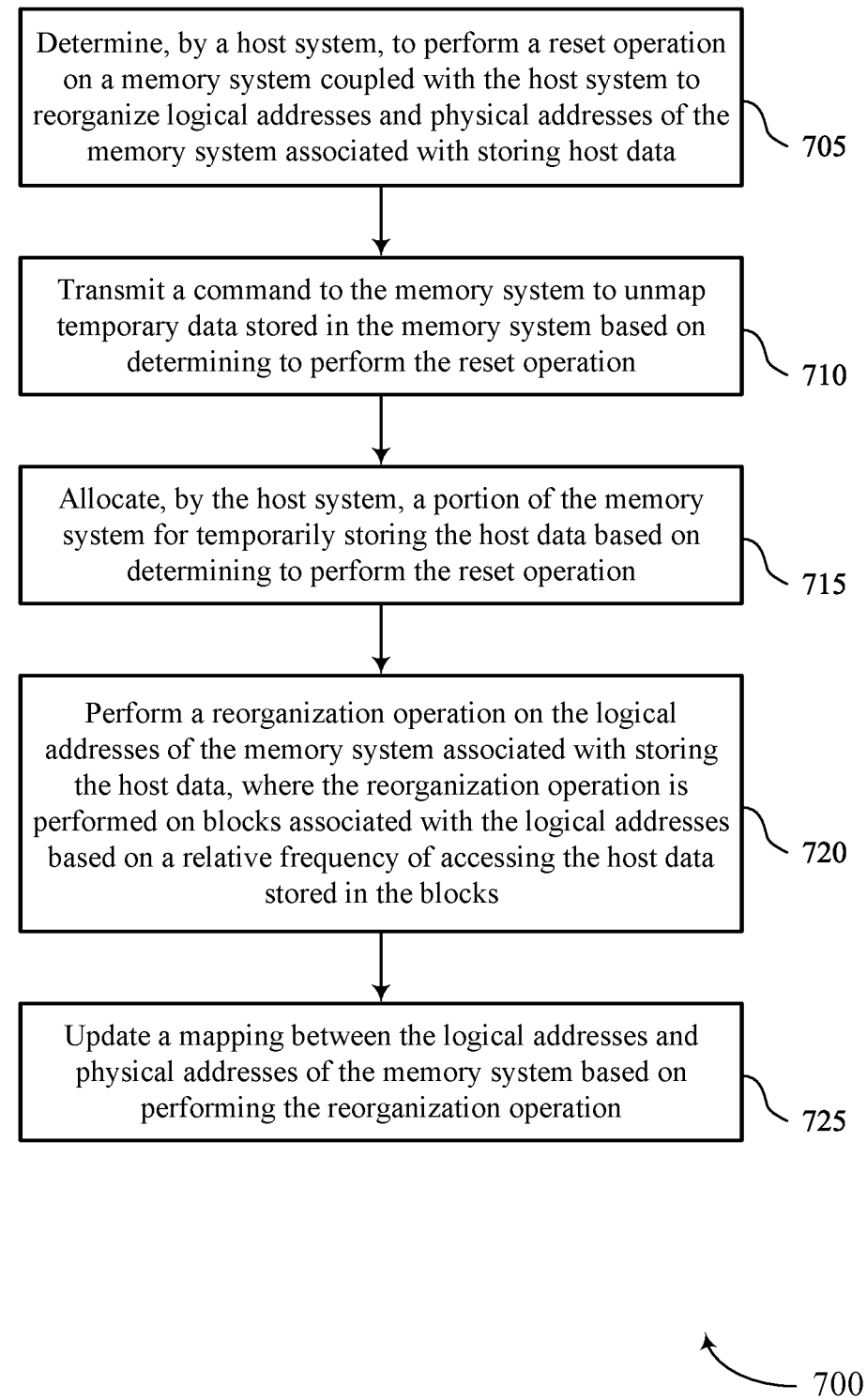

FIG. 7 illustrates a flowchart showing a method 700 that supports memory system host data reset function in accordance with examples as disclosed herein. The operations of method 700 may be implemented by a host system or its components as described herein. For example, the operations of method 700 may be performed by a host system as described with reference to FIGS. 1 through 3 and 5. In some examples, a host system may execute a set of instructions to control the functional elements of the device to perform the described functions. Additionally, or alternatively, the host system may perform aspects of the described functions using special-purpose hardware.

At 705, the method may include determining, by a host system, to perform a reset operation on a memory system coupled with the host system to reorganize logical addresses and physical addresses of the memory system associated with storing host data. The operations of 705 may be performed in accordance with examples as disclosed herein. In some examples, aspects of the operations of 705 may be performed by a determination component 525 as described with reference to FIG. 5.

At 710, the method may include transmitting a command to the memory system to unmap temporary data stored in the memory system based on determining to perform the reset operation. The operations of 710 may be performed in accordance with examples as disclosed herein. In some examples, aspects of the operations of 710 may be performed by a transmission component 530 as described with reference to FIG. 5.

At 715, the method may include allocating, by the host system, a portion of the memory system for temporarily storing the host data based on determining to perform the reset operation. The operations of 715 may be performed in accordance with examples as disclosed herein. In some examples, aspects of the operations of 715 may be performed by an allocation component 535 as described with reference to FIG. 5.

At 720, the method may include performing a reorganization operation on the logical addresses of the memory system associated with storing the host data, where the reorganization operation is performed on blocks associated with the logical addresses based on a relative frequency of accessing the host data stored in the blocks. The operations of 720 may be performed in accordance with examples as disclosed herein. In some examples, aspects of the operations of 720 may be performed by a reorganization component 540 as described with reference to FIG. 5.

At 725, the method may include updating a mapping between the logical addresses and physical addresses of the memory system based on performing the reorganization operation. The operations of 725 may be performed in accordance with examples as disclosed herein. In some examples, aspects of the operations of 725 may be performed by a mapping component 545 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 18: A method, apparatus, or non-transitory computer-readable medium including operations, features, circuitry, logic, means, or instructions, or any combination thereof for determining, by a host system, to perform a reset operation on a memory system coupled with the host system to reorganize logical addresses and physical addresses of the memory system associated with storing host data; transmitting a command to the memory system to unmap temporary data stored in the memory system based on determining to perform the reset operation; allocating, by the host system, a portion of the memory system for temporarily storing the host data based on determining to perform the reset operation; performing a reorganization operation on the logical addresses of the memory system associated with storing the host data, where the reorganization operation is performed on blocks associated with the logical addresses based on a relative frequency of accessing the host data stored in the blocks; and updating a mapping between the logical addresses and physical addresses of the memory system based on performing the reorganization operation.

Aspect 19: The method, apparatus, or non-transitory computer-readable medium of aspect 18, further including operations, features, circuitry, logic, means, or instructions, or any combination thereof for transmitting an indication of the mapping to the memory system based on updating the mapping.

Aspect 20: The method, apparatus, or non-transitory computer-readable medium of any of aspects 18 through 19, where the reorganization operation includes a garbage collection operation on the logical addresses of the memory system.

Aspect 21: The method, apparatus, or non-transitory computer-readable medium of any of aspects 18 through 20, further including operations, features, circuitry, logic, means, or instructions, or any combination thereof for disabling a functionality for performing write operations on the memory system for a duration associated with performing the reset operation.

Aspect 22: The method, apparatus, or non-transitory computer-readable medium of any of aspects 18 through 21, further including operations, features, circuitry, logic, means, or instructions, or any combination thereof for receiving an indication from the memory system that a decrease in an access performance of the memory system satisfies a threshold, where determining to perform the reset operation is based on receiving the indication.

Aspect 23: The method, apparatus, or non-transitory computer-readable medium of any of aspects 18 through 22, further including operations, features, circuitry, logic, means, or instructions, or any combination thereof for transmitting a second command to the memory system to perform the reset operation, where determining to perform the reset operation is based on receiving the second command.

Aspect 24: The method, apparatus, or non-transitory computer-readable medium of any of aspects 18 through 23, where allocating the portion includes operations, features, circuitry, logic, means, or instructions, or any combination thereof for allocating a quantity of the logical addresses of the memory system for temporarily storing the host data, the quantity based on determining a size of the host data to be temporarily stored.

Aspect 25: The method, apparatus, or non-transitory computer-readable medium of any of aspects 18 through 24, further including operations, features, circuitry, logic, means, or instructions, or any combination thereof for identifying a portion of a non-volatile memory device of the memory system dedicated for recovery to serve as the allocated portion of the memory system, where allocating the portion of the memory system for temporarily storing the host data is based on identifying the portion of the non-volatile memory device.

Aspect 26: The method, apparatus, or non-transitory computer-readable medium of any of aspects 18 through 25, where performing the reorganization operation includes operations, features, circuitry, logic, means, or instructions, or any combination thereof for identifying that a first portion of the host data is accessed relatively infrequently and that a second portion of the host data is accessed relatively frequently and reorganizing the first portion of the host data before reorganizing the second portion of the host data.

Aspect 27: The method, apparatus, or non-transitory computer-readable medium of aspect 26, where identifying whether the first portion or the second portion of the host data is accessed relatively infrequently or frequently is based on identifying version numbers associated with the first portion or the second portion of the host data, respectively.

Aspect 28: The method, apparatus, or non-transitory computer-readable medium of any of aspects 26 through 27, where identifying whether the first portion or the second portion of the host data is accessed relatively infrequently or frequently is based on a stream identification value associated with the first portion or the second portion of the host data, respectively.

Aspect 29: The method, apparatus, or non-transitory computer-readable medium of any of aspects 18 through 28, where the logical addresses and physical addresses of the memory system exclude system data.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and a second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
   determining to perform a reset operation on a memory system to reorganize logical addresses and physical addresses of the memory system associated with storing host data;
   allocating a portion of the memory system for temporarily storing the host data based on determining to perform the reset operation;
   performing a plurality of refresh operations on the host data in a plurality of blocks associated with the logical addresses of the memory system using the allocated portion of the memory system, wherein the plurality of refresh operations are performed on blocks of the plurality of blocks in an order based on a relative frequency of accessing the host data stored in the plurality of blocks; and
   performing, based on performing the plurality of refresh operations, a garbage collection operation to consolidate the host data from pages of the plurality of blocks.

2. The method of claim 1, further comprising:
   disabling a functionality for performing write operations on the memory system for a duration associated with performing the reset operation.

3. The method of claim 1, further comprising:
   determining that a decrease in an access performance of the memory system satisfies a threshold, wherein determining to perform the reset operation is based on identifying that the decrease in the access performance satisfies the threshold.

4. The method of claim 1, further comprising:
   receiving a command to perform the reset operation from a host system coupled with the memory system, wherein determining to perform the reset operation is based on receiving the command.

5. The method of claim 1, further comprising:
   receiving a command from a host system coupled with the memory system to unmap temporary data stored by the memory system based on determining to perform the reset operation; and
   unmapping the temporary data from the memory system based on receiving the command.

6. The method of claim 1, further comprising:
   identifying a portion of a non-volatile memory device of the memory system dedicated for recovery to serve as the allocated portion of the memory system, wherein allocating the portion of the memory system for temporarily storing the host data is based on identifying the portion of the non-volatile memory device.

7. The method of claim 1, wherein performing the plurality of refresh operations comprises:
   identifying that a first portion of the host data is accessed relatively infrequently and that a second portion of the host data is accessed relatively frequently; and
   refreshing the first portion of the host data before refreshing the second portion of the host data.

8. The method of claim 7, wherein identifying whether the first portion or the second portion of the host data is accessed relatively infrequently or frequently is based on identifying version numbers or stream identification values associated with the first portion or the second portion of the host data, respectively.

9. The method of claim 7, wherein identifying whether the first portion or the second portion of the host data is accessed relatively infrequently or frequently is based on determining whether a decrease in an access performance of the first portion or the second portion of the host data satisfies a threshold, respectively.

10. The method of claim 1, wherein:
    the plurality of refresh operations are performed according to a first granularity, and the garbage collection operation is performed according to a second granularity less than the first granularity, and
    the first granularity is a per-block basis and the second granularity is a per-page basis.

11. The method of claim 1, further comprising:
    updating a mapping between the logical addresses and the physical addresses of the memory system based on a host system coupled with the memory system reorganizing the logical addresses.

12. A method, comprising:
    determining, by a host system, to perform a reset operation on a memory system coupled with the host system to reorganize logical addresses and physical addresses of the memory system associated with storing host data;
    transmitting a command to the memory system to unmap temporary data stored in the memory system based on determining to perform the reset operation;
    allocating, by the host system, a portion of the memory system for temporarily storing the host data based on determining to perform the reset operation;
    performing a reorganization operation on the logical addresses of the memory system associated with storing the host data, wherein the reorganization operation is performed on blocks associated with the logical addresses based on a relative frequency of accessing the host data stored in the blocks; and
    updating a mapping between the logical addresses and the physical addresses of the memory system based on performing the reorganization operation.

13. The method of claim 12, further comprising:
    transmitting an indication of the mapping to the memory system based on updating the mapping.

14. The method of claim 12, wherein the reorganization operation comprises a garbage collection operation on the logical addresses of the memory system.

15. The method of claim 12, further comprising:
    disabling a functionality for performing write operations on the memory system for a duration associated with performing the reset operation.

16. The method of claim 12, further comprising:
    receiving an indication from the memory system that a decrease in an access performance of the memory system satisfies a threshold, wherein determining to perform the reset operation is based on receiving the indication.

17. The method of claim 12, further comprising:
identifying a portion of a non-volatile memory device of the memory system dedicated for recovery to serve as the allocated portion of the memory system, wherein allocating the portion of the memory system for temporarily storing the host data is based on identifying the portion of the non-volatile memory device.

18. The method of claim 12, wherein performing the reorganization operation comprises:
identifying that a first portion of the host data is accessed relatively infrequently and that a second portion of the host data is accessed relatively frequently; and
reorganizing the first portion of the host data before reorganizing the second portion of the host data.

19. The method of claim 18, wherein identifying whether the first portion or the second portion of the host data is accessed relatively infrequently or frequently is based on identifying version numbers or stream identification values associated with the first portion or the second portion of the host data, respectively.

20. An apparatus, comprising:
a memory system comprising a plurality of blocks; and
a controller coupled with the memory system and configured to cause the apparatus to:
determine to perform a reset operation on the memory system to reorganize logical addresses and physical addresses of the plurality of blocks associated with storing host data;
allocate a portion of the memory system for temporarily storing the host data based on determining to perform the reset operation;
perform a plurality of refresh operations on the host data in the plurality of blocks using the allocated portion of the memory system, wherein the plurality of refresh operations are performed on blocks of the plurality of blocks in an order based on a relative frequency of accessing the host data stored in the plurality of blocks; and
perform, based on performing the plurality of refresh operations, a garbage collection operation to consolidate the host data from pages of the plurality of blocks.

* * * * *